(12) United States Patent
Mohite et al.

(10) Patent No.: US 12,725,079 B2
(45) Date of Patent: Sep. 1, 2026

(54) METHODS AND SYSTEMS FOR HIGH RESOLUTION AND SCALABLE CROP YIELD FORECASTING

(71) Applicant: Tata Consultancy Services Limited, Mumbai (IN)

(72) Inventors: Jayantrao Mohite, Thane (IN); Suryakant Ashok Sawant, Thane (IN); Rishabh Agarwal, Thane (IN); Ankur Pandit, Thane (IN); Srinivasu Pappula, Hyderabad (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 626 days.

(21) Appl. No.: 18/209,080

(22) Filed: Jun. 13, 2023

(65) Prior Publication Data

US 2024/0028957 A1 Jan. 25, 2024

(30) Foreign Application Priority Data

Jul. 20, 2022 (IN) ............................ 202221041643

(51) Int. Cl.
*G06N 20/00* (2019.01)
*G06Q 10/04* (2023.01)

(52) U.S. Cl.
CPC ............ *G06N 20/00* (2019.01); *G06Q 10/04* (2013.01)

(58) Field of Classification Search
CPC .............................. G06N 20/00; G06Q 10/04
See application file for complete search history.

(56) References Cited

U.S. PATENT DOCUMENTS

| | | | | |
|---|---|---|---|---|
| 7,702,597 | B2 * | 4/2010 | Singh | G06Q 10/04 706/21 |
| 2014/0358466 | A1 * | 12/2014 | Foster | A01D 41/127 702/101 |
| 2019/0228477 | A1 * | 7/2019 | Carter | G01W 1/10 |
| 2020/0342226 | A1 * | 10/2020 | Bengtson | G06N 3/09 |
| 2022/0301080 | A1 * | 9/2022 | Catala Luque | G06N 3/0499 |
| 2024/0028957 | A1 * | 1/2024 | Mohite | G06N 20/00 |

OTHER PUBLICATIONS

Johnson et al., "USA Crop Yield Estimation with MODIS NDVI: Are Remotely Sensed Models Better than Simple Trend Analyses?" Remote Sens., 13 (2021).

* cited by examiner

*Primary Examiner* — David E Choi
(74) *Attorney, Agent, or Firm* — Finnegan, Henderson, Farabow, Garrett & Dunner, LLP

(57) ABSTRACT

This disclosure relates to methods and systems for high resolution and scalable crop yield forecasting by first developing a first crop yield forecasting model to generate coarse resolution yield maps and further dynamically selecting a set of pixels from the coarse resolution yield maps. The coarse resolution yield maps, satellite, weather and soil related data are fed as input to a second crop yield forecasting to generate high resolution crop yield forecasting maps. Further, domain knowledge about crop growth stages, economically important crop growth stages and weather based triggers are identified to quantify extent of change in crop yield. This helps in crop yield forecasting during real time adverse weather conditions. Finally, an adjusted crop yield model is obtained after adjusting losses incurred due to the real time adverse weather conditions to obtain accurate high resolution crop yield forecasting maps. The method of present disclosure is inexpensive, light-weight, and scalable.

13 Claims, 2 Drawing Sheets

Figure 2:
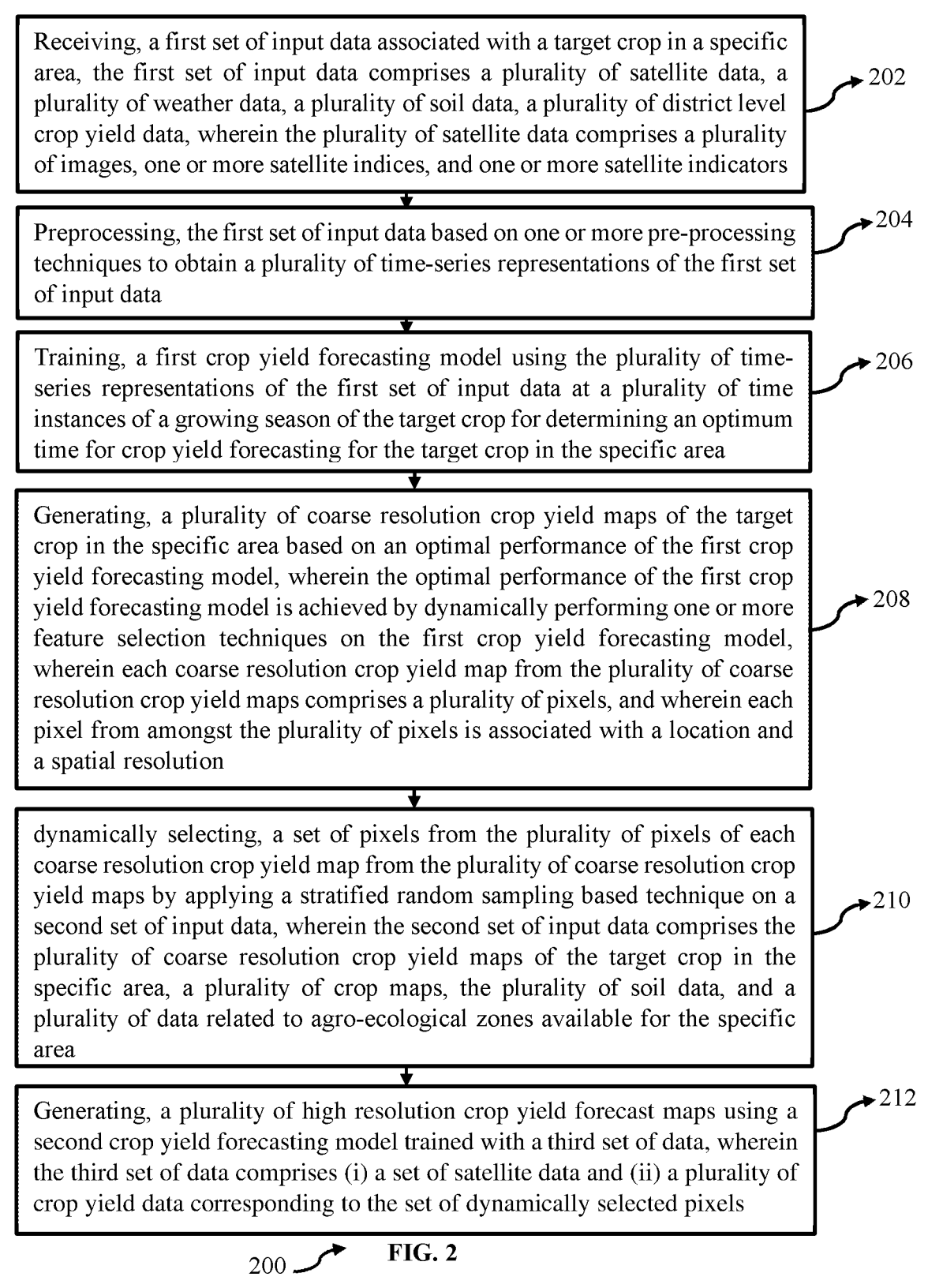

Receiving, a first set of input data associated with a target crop in a specific area, the first set of input data comprises a plurality of satellite data, a plurality of weather data, a plurality of soil data, a plurality of district level crop yield data, wherein the plurality of satellite data comprises a plurality of images, one or more satellite indices, and one or more satellite indicators

202

Preprocessing, the first set of input data based on one or more pre-processing techniques to obtain a plurality of time-series representations of the first set of input data

204

Training, a first crop yield forecasting model using the plurality of time-series representations of the first set of input data at a plurality of time instances of a growing season of the target crop for determining an optimum time for crop yield forecasting for the target crop in the specific area

206

Generating, a plurality of coarse resolution crop yield maps of the target crop in the specific area based on an optimal performance of the first crop yield forecasting model, wherein the optimal performance of the first crop yield forecasting model is achieved by dynamically performing one or more feature selection techniques on the first crop yield forecasting model, wherein each coarse resolution crop yield map from the plurality of coarse resolution crop yield maps comprises a plurality of pixels, and wherein each pixel from amongst the plurality of pixels is associated with a location and a spatial resolution

208 dynamically selecting, a set of pixels from the plurality of pixels of each coarse resolution crop yield map from the plurality of coarse resolution crop yield maps by applying a stratified random sampling based technique on a second set of input data, wherein the second set of input data comprises the plurality of coarse resolution crop yield maps of the target crop in the specific area, a plurality of crop maps, the plurality of soil data, and a plurality of data related to agro-ecological zones available for the specific area

210

Generating, a plurality of high resolution crop yield forecast maps using a second crop yield forecasting model trained with a third set of data, wherein the third set of data comprises (i) a set of satellite data and (ii) a plurality of crop yield data corresponding to the set of dynamically selected pixels

METHODS AND SYSTEMS FOR HIGH RESOLUTION AND SCALABLE CROP YIELD FORECASTING

PRIORITY CLAIM

This U.S. patent application claims priority under 35 U.S.C. § 119 to: India Application No. 202221041643, filed on Jul. 20, 2022. The entire contents of the aforementioned application are incorporated herein by reference.

TECHNICAL FIELD

The disclosure herein generally relates to crop yield forecast, and, more particularly, to methods and systems for high resolution and scalable crop yield forecasting.

BACKGROUND

With an increase in population size of countries, a demand for food production is increasing. To meet the increased demand for food production, effective and efficient agricultural practices for farming are required. This can be achieved by using better measures for crop monitoring and crop yield forecasting. Adverse weather and changes in climate over the years are affecting the crop heavily, leading to significant yield losses. Thus, the crop monitoring and yield forecasting is crucial to account for the loss or surplus yield from a given season. Traditional yield estimation or crop cutting experiments involve physical visits to the fields and are time and labor intensive. Thus, various remote sensing and/or modeling based methods are developed for yield estimation/forecasting. Traditional remote sensing and/or modeling based methods use physical or process based models. Due to involvement of physical process in terms of simulation, precision or accuracy of yield estimation is high. However, the data needed from crop, soil, weather is quite high and scalability becomes a major challenge with the traditional methods.

There are few conventional methods that use remote sensing observations into crop growth models to get the crop yield to address the scalability issues to some extent. However, these conventional methods still need ground truth data to be collected. Further, a popular approach is to use empirical/statistical/machine learning models. However, such models still need some ground truth data to be collected and are affected by quantity and quality of ground truth data. The quantity and quality of ground truth data affects the accuracy and forecasting ability of the models in adverse situations. There exist some approaches to create crop growth simulations and use that as ground data to develop the crop yield forecasting models. While the approach is less data intensive, such models are affected by choice of parameters used for simulation. Thus, one of the common factors across all the conventional methods is data dependency from the ground which leads to higher cost since it is really difficult and costly to get the yield data from ground.

SUMMARY

Embodiments of the present disclosure present technological improvements as solutions to one or more of the above-mentioned technical problems recognized by the inventors in conventional systems. For example, in one embodiment, a processor implemented method for high resolution and scalable crop yield forecasting is provided. The method includes receiving, via one or more hardware processors, a first set of input data associated with a target crop in a specific area, the first set of input data comprises a plurality of satellite data, a plurality of weather data, a plurality of soil data, and a plurality of district level crop yield data, wherein the plurality of satellite data comprises a plurality of images, one or more satellite indices, and one or more satellite indicators; preprocessing, via the one or more hardware processors, the first set of input data based on one or more pre-processing techniques to obtain a plurality of time-series representations of the first set of input data; training, via the one or more hardware processors, a first crop yield forecasting model using the plurality of time-series representations of the first set of input data at a plurality of time instances of a growing season of the target crop, for determining an optimum time for crop yield forecasting for the target crop in the specific area; generating, via the one or more hardware processors, a plurality of coarse resolution crop yield maps of the target crop in the specific area based on an optimal performance of the first crop yield forecasting model, wherein the optimal performance of the first crop yield forecasting model is achieved by dynamically performing one or more feature selection techniques on the first crop yield forecasting model, wherein each coarse resolution crop yield map from the plurality of coarse resolution crop yield maps comprises a plurality of pixels, and wherein each pixel from amongst the plurality of pixels is associated with a location and a spatial resolution; dynamically selecting, via the one or more hardware processors, a set of pixels from the plurality of pixels of each coarse resolution crop yield map from the plurality of coarse resolution crop yield maps by applying a stratified random sampling based technique on a second set of input data, wherein the second set of input data comprises the plurality of coarse resolution crop yield maps of the target crop in the specific area, a plurality of crop maps, the plurality of soil data, and a plurality of data related to agro-ecological zones available for the specific area; and generating, via the one or more hardware processors, a plurality of high resolution crop yield forecast maps using a second crop yield forecasting model trained with a third set of data, wherein the third set of data comprises (i) a set of satellite data and (ii) a plurality of crop yield data corresponding to the set of dynamically selected pixels.

In another aspect, a system for high resolution and scalable crop yield forecasting is provided. The system includes a memory storing instructions, one or more communication interfaces; and one or more hardware processors coupled to the memory via the one or more communication interfaces, wherein the one or more hardware processors are configured by the instructions to receive, a first set of input data associated with a target crop in a specific area, the first set of input data comprises a plurality of satellite data, a plurality of weather data, a plurality of soil data, and a plurality of district level crop yield data, wherein the plurality of satellite data comprises a plurality of images, one or more satellite indices, and one or more satellite indicators; preprocess, the first set of input data based on one or more pre-processing techniques to obtain a plurality of time-series representations of the first set of input data; train, a first crop yield forecasting model using the plurality of time-series representations of the first set of input data at a plurality of time instances of a growing season of the target crop, for determining an optimum time for crop yield forecasting for the target crop in the specific area; generate, a plurality of coarse resolution crop yield maps of the target crop in the specific area based on an optimal performance of the first crop yield forecasting model, wherein the optimal performance of the first crop yield forecasting model is achieved by dynamically performing one or more feature selection techniques on the first crop yield forecasting model, wherein each coarse resolution crop yield map from the plurality of coarse resolution crop yield maps comprises a plurality of pixels, and wherein each pixel from amongst the plurality of pixels is associated with a location and a spatial resolution; dynamically select, a set of pixels from the plurality of pixels of each coarse resolution crop yield map from the plurality of coarse resolution crop yield maps by applying a stratified random sampling based technique on a second set of input data, wherein the second set of input data comprises the plurality of coarse resolution crop yield maps of the target crop in the specific area, a plurality of crop maps, the plurality of soil data, and a plurality of data related to agro-ecological zones available for the specific area; and generate, a plurality of high resolution crop yield forecast maps using a second crop yield forecasting model trained with a third set of data, wherein the third set of data comprises (i) a set of satellite data and (ii) a plurality of crop yield data corresponding to the set of dynamically selected pixels.

In yet another aspect, a non-transitory computer readable medium for high resolution and scalable crop yield forecasting is provided. The program includes receiving, a first set of input data associated with a target crop in a specific area, the first set of input data comprises a plurality of satellite data, a plurality of weather data, a plurality of soil data, and a plurality of district level crop yield data, wherein the plurality of satellite data comprises a plurality of images, one or more satellite indices, and one or more satellite indicators; preprocessing, the first set of input data based on one or more pre-processing techniques to obtain a plurality of time-series representations of the first set of input data; training, a first crop yield forecasting model using the plurality of time-series representations of the first set of input data at a plurality of time instances of a growing season of the target crop, for determining an optimum time for crop yield forecasting for the target crop in the specific area; generating, a plurality of coarse resolution crop yield maps of the target crop in the specific area based on an optimal performance of the first crop yield forecasting model, wherein the optimal performance of the first crop yield forecasting model is achieved by dynamically performing one or more feature selection techniques on the first crop yield forecasting model, wherein each coarse resolution crop yield map from the plurality of coarse resolution crop yield maps comprises a plurality of pixels, and wherein each pixel from amongst the plurality of pixels is associated with a location and a spatial resolution; dynamically selecting, a set of pixels from the plurality of pixels of each coarse resolution crop yield map from the plurality of coarse resolution crop yield maps by applying a stratified random sampling based technique on a second set of input data, wherein the second set of input data comprises the plurality of coarse resolution crop yield maps of the target crop in the specific area, a plurality of crop maps, the plurality of soil data, and a plurality of data related to agro-ecological zones available for the specific area; and generating, a plurality of high resolution crop yield forecast maps using a second crop yield forecasting model trained with a third set of data, wherein the third set of data comprises (i) a set of satellite data and (ii) a plurality of crop yield data corresponding to the set of dynamically selected pixels.

In accordance with an embodiment of the present disclosure, the stratified random sampling based technique comprises at least one of (i) a probability sampling or (ii) a non-probability sampling depending upon variability of a region of crop.

In accordance with an embodiment of the present disclosure, the first crop yield forecasting model and the second crop yield forecasting model comprises at least one of (i) a multiple linear regression model and (ii) a non-liner regression model depending upon type of crop, region of crop and amount of data availability.

In accordance with an embodiment of the present disclosure, the method further comprises quantifying one or more crop yield losses based on information comprised in a dynamically updated database, wherein the dynamically updated database comprises domain knowledge about crop growth stages, economically important crop growth stages and real time weather based adverse event triggers.

In accordance with an embodiment of the present disclosure, the plurality of high resolution crop yield forecast maps are obtained by adjusting the quantified one or more crop yield losses.

In accordance with an embodiment of the present disclosure, the plurality of high resolution crop yield forecast maps are scalable.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 2 is a flow diagram illustrating a method high resolution and scalable crop yield forecasting in accordance with some embodiments of the present disclosure.

DETAILED DESCRIPTION

Figure 1:
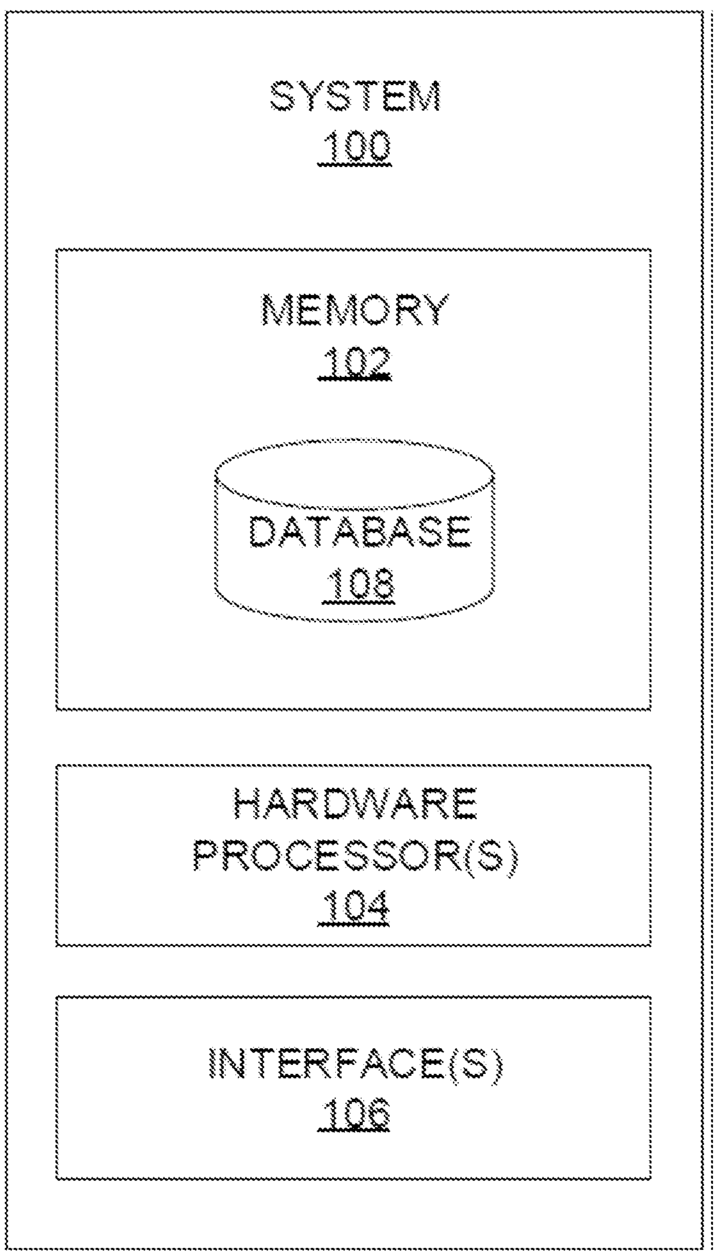
FIG. 1 illustrates an exemplary system for high resolution and scalable crop yield forecasting according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Crop yield forecasting is a crucial factor to meet growing food demands of people. Conventional crop yield forecasting methods are highly dependent on ground truth data, high compute intensive and expensive. The present disclosure addresses unresolved problems of the conventional methods by providing methods and systems for high resolution and scalable crop yield forecasting. Embodiments of the present disclosure provide a method and system for high resolution and scalable crop yield forecasting. The present disclosure describes a two stage approach for crop yield forecasting. Here, a first stage involves development of a first crop yield forecasting model (alternatively referred as baseline crop yield forecasting model) to generate coarse resolution yield maps. In an embodiment, openly available yield and remote sensing data which is independent of ground data is collected for model development of high resolution crop yield forecasting. A second stage involves dynamic selection of pixels from the coarse resolution yield maps and using the same to develop a second crop yield forecasting model for high generation resolution yield maps. The dynamic selection of pixels of crop yield data is useful to cover the heterogeneity of a region and not biased by distribution of the data. In the present disclosure, domain knowledge about crop growth stages is used and economically important crop growth stages and weather based triggers are identified to quantify extent of change in crop yield. This also helps in yield forecasting during real time adverse weather conditions. Finally, adjusted yield model obtained after adjusting losses incurred due to the real time adverse weather conditions are further used for generating high resolution yield maps. The method of present disclosure is light-weight, scalable and does not require any intervention from a subject matter expert.

Referring now to the drawings, and more particularly to FIG. 1 and FIG. 2, where similar reference characters denote corresponding features consistently throughout the figures, there are shown preferred embodiments and these embodiments are described in the context of the following exemplary system and/or method.

FIG. 1 illustrates an exemplary system for high resolution and scalable crop yield forecasting according to some embodiments of the present disclosure. In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, one or more software processing components and/or hardware processors. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 is configured to fetch and execute computer-readable instructions stored in the memory 102. In an embodiment, the system 100 can be implemented in a variety of computing systems including laptop computers, notebooks, hand-held devices such as mobile phones with sensing, processing, communicating and storage capability, workstations, mainframe computers, servers, a network cloud and the like. In an embodiment, the mobile phones could be Global Positioning System (GPS) enabled mobile phone to capture few geotagged points from field boundaries of selected fields. Further, several mobile crowd sourcing application or other software program may be running on the mobile phones.

The I/O interface(s) 106 can include a variety of software and hardware interfaces, for example, a web interface, a graphical user interface, a touch user interface (TUI) and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server. In an embodiment, servers are used to process requests and send responses, to execute algorithms for detection and training.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Further, the memory 102 may include a database 108, which may store data related to agricultural domain, crops, time series remote sensing data, coarse and high resolution satellite data, soil data, weather related data, data related to agro-ecological zones, yield statistics including District, Taluka, State level openly available yield statistics, raster's and optical as well Synthetic Aperture Radar (SAR) data. Further, the database comprises data related to resilient and susceptible crop stages and related weather/adverse events. This data is maintained crop-wise and updated over a period of time in the database 108.

The database 108 further comprises one or more models such as machine learning or deep learning based regression models which when invoked and executed perform corresponding steps/actions as per the requirement by the system 100 to perform the methodologies described herein. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis. In an embodiment, the database 108 may be external (not shown) to the system 100 and coupled to the system via the I/O interface 106.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

FIG. 2, with reference to FIG. 1, is a flow diagram illustrating a method 200 for high resolution and scalable crop yield forecasting using the system 100 of FIG. 1, in accordance with some embodiments of the present disclosure. The steps of the method 200 of the present disclosure will now be explained with reference to components of the system 100 of FIG. 1. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to FIG. 2, at step 202 of the present disclosure, the one or more hardware processors 104 are configured to receive a first set of input data associated with a target crop in a specific area. The first set of input data comprises a plurality of satellite data, a plurality of weather data, a plurality of soil data, a plurality of district level crop yield data. In an embodiment, the plurality of district level crop yield data includes openly available yield statistics from government or other authentic sources. Such datasets may definitely not be available at field level. However, they would be providing area/crop level statistics such as district/taluka for geographies like India. However, division may be Municipality for the geographies like Brazil. Such datasets are published by the government of a respective geography and other agencies on seasonal basis. In the present disclosure, data available as per the geography is used. In an embodiment, the plurality of satellite data comprises a plurality of images, one or more satellite indices, and one or more satellite indicators. In an embodiment, the satellite data may be captured by one or more satellite sensors such as Moderate Resolution Imaging Spectroradiometer (MODIS), Advanced very-high-resolution radiometer (AVHRR), Sentinel-1, Sentinel-2, and/or the like. The one or more satellite indices may include but not limited to normalized difference vegetation index (NDVI), enhanced vegetation index (EVI), and/or the like. Further, the one or more satellite indicators may include but not limited to leaf area index (LAI), land surface temperature (LST), and/or the like. The plurality of weather data may include one or more weather indicators providing climatic conditions of the specific area which may include but not limited rainfall, humidity, maximum temperature, minimum temperature, and/or the like. In an embodiment, the plurality of weather data of the specific area may be captured by a weather satellite such as Tropical Rainfall Measuring Mission (TRMM). The plurality of soil data includes parameters associated with soil details of the specific area such as soil texture, soil depth, soil variation within the specific area and so on. In an embodiment, the plurality of soil data can be obtained from freely available data sources. For instance, soilGrids™ which is system for digital soil mapping based on global compilation of soil profile data and environmental layers may be used to provide various soil attributes data at a specific spatial resolution (say 250 m in the present disclosure).

Further, at step 204 of FIG. 2, the one or more hardware processors 104 are configured to preprocess the first set of input data based on one or more pre-processing techniques to obtain a plurality of time-series representations of the first set of input data. In an embodiment, the one or more pre-processing techniques includes but not limited to atmospheric correction (i.e., conversion of Digital Number (DN) values to Surface reflectance), Geographic information system (GIS) based operations such as clipping, mosaicking, and/or the like to get the data for the specific region.

Referring to FIG. 2, at step 206 of FIG. 2, the one or more hardware processors 104 are configured to train a first crop yield forecasting model using the plurality of time-series representations of the first set of input data at a plurality of time instances of a growing season of the target crop for determining an optimum (i.e., best) time for crop yield forecasting for the target crop in the specific area. In an embodiment, the plurality of satellite data and the plurality of weather data are aggregated (i.e., upsampled or upscaled) at division level (e.g., mean/median of particular parameter such as Temperature). Before aggregation, these datasets are masked with a crop mask to obtain the target crop. In other words, the target crop is obtained by applying a crop masking technique. The crop masking technique to obtain a crop mask is a known in the art machine learning approach (e.g., refer Indian Patent Application No IN 202121003692 titled 'Method And System For Providing Generalized Approach For Crop Mapping Across Regions With Varying Characteristics'). Further, the plurality of district level crop yield data (also referred as division level yield information) available openly and the plurality of satellite data and the plurality of weather data aggregated at division level are used for model development. Machine learning or deep learning based regression relationship is established between the yield and satellite/weather indicators. Multiple models are trained during growing season at multiple time instances to decide on the best model for a crop and area.

In an embodiment, at step 208 of FIG. 2, the one or more hardware processors are configured to generate, a plurality of coarse resolution crop yield maps of the target crop in the specific area based on an optimal performance of the first crop yield forecasting model. The optimal performance of the first crop yield forecasting model is achieved by dynamically performing one or more feature selection techniques on the first crop yield forecasting model. The one or more feature selection techniques are used to identify best subset of bands and/or indices which are provide best results at that instance. The one or more feature selection techniques may include but not limited to stepwise elimination, stepwise addition, random forest based feature importance, Least Absolute Shrinkage and Selection Operator (LASSO), Radar Integrated Display with Geospatial Elements (RIDGE) regression, Genetic Algorithm, and/or the like. In an embodiment, each coarse resolution crop yield map from the plurality of coarse resolution crop yield maps comprises a plurality of pixels and each pixel from amongst the plurality of pixels is associated with a location and a spatial resolution.

The steps 202 through 208 are better understood by way of the following exemplary explanation.

Considering an example scenario, where the first crop yield forecasting model is developed for India. For the example scenario, the yield statistics is available at district level for multiple crops and districts across India. In this case, same data or similar kind of openly available data for coarse resolution yield forecast modeling is used. For example, it is assumed that the target crop is Wheat and data is available for 400 districts for the last 20 years. This way, 8000 yield datapoints (alternatively referred as 'samples') of (400 districts×20 years) are obtained. Further, various indices, indicators from satellite sensors such as MODIS, AVHRR and weather satellites such as TRMM are extracted. In the present disclosure, a specific area belonging to the target crop is considered, hence, before extracting the satellite data for a particular district and year, those particular districts are masked using the target crop (i.e., wheat mask in this case). This ensures noise-free data. After applying the crop mask, satellite indices such as NDVI, EVI, satellite indicators such as LST, LAI, and weather indicators such as Minimum, Maximum temperature, rainfall, and/or the lie are extracted for the districts and years for which yield data was available. Further, a machine learning or deep learning based regression relationship is established between the district level yield data and satellite and weather based indices, indicators, and/or the like. This modeling process is repeated at multiple time instances (t1, t2, t3, t4) during a crop growing season to decide the best time for yield forecasting for the target crop. The model which produces best performance is applied on the specific area to generate the plurality of coarse resolution yield forecast maps. Mathematically, this is expressed as:

$$\text{Target Crop}=\text{Wheat}, \text{Districts}=400, \text{Years}=20$$

It is assumed when the variables such as NDVI($x_1$), EVI($x_2$), LAI($x_4$), MinTemp($x_5$), MaxTemp($x_6$), and Rainfall ($x_7$) are considered, then the first crop yield forecasting model to provide coarse resolution yield at time instant t is provided as in equation (1) below:

$$\text{coarseYield}(t)=f(x_1,x_2,x_3,x_4\ldots x_n)(t) \quad (1)$$

Further, the first crop yield forecasting model at time instance $t_1$ may take the following form as provided in equation (2) below:

$$\text{coarseYield}(t_1)=x_0+(3.15*x_1)-(2.05*x_3) \quad (2)$$

The first crop yield forecasting model at time instance $t_2$ may take the following form as provided in equation (3) below:

$$\text{coarseYield}(t_2)=x_0+(1.35*x_1)-(5.05*x_2)-(0.88*x_4) \quad (3)$$

The first crop yield forecasting model at time instance $t_3$ may take the following form as provided in equation (4) below:

$$\text{coarseYield}(t_3)=x_0+(1.15*x_1)+(2.34*x_4)-(0.23*x_5) \quad (4)$$

Here, time instances are decided based on the crop season. Moreover, for each time instance, variables considered by the first crop yield forecasting model is decided by the first crop yield forecasting model dynamically by using the one or more feature selection technique to get the best performance. For example, it is assumed that $R_2$ of the model is 0.71, 0.75 and 0.84 at time instance $t_1$, $t_2$ and $t_3$. As the first crop yield forecasting model at time instance $t_3$ has the highest $R_2$, the same first crop yield forecasting model is used to generate the plurality of coarse resolution yield maps. While applying the first crop yield forecasting model, the variables are chosen by the first crop yield forecasting model at 250-500 m resolution and generate the plurality of coarse resolution yield maps. This is again depending upon the type of variable chosen by the best model.

Referring back to FIG. 2, at step 210, the one or more hardware processors 104 are configured to dynamically select a set of pixels from the plurality of pixels of each coarse resolution crop yield map from the plurality of coarse resolution crop yield maps by applying a stratified random sampling based technique on a second set of input data. The second set of input data comprises the plurality of coarse resolution crop yield maps of the target crop in the specific area, a plurality of crop maps, the plurality of soil data, and a plurality of data related to agro-ecological zones available for the specific area. The stratified random sampling based technique comprises at least one of (i) a probability sampling or (ii) a non-probability sampling depending upon variability of a region of crop. In an embodiment, the plurality of crop maps are different from the plurality of coarse resolution crop yield maps and are obtained using a propitiatory machine learning algorithm which is a state of the art method (e.g., refer Indian Patent Application No IN 202121003692 titled 'Method And System For Providing Generalized Approach For Crop Mapping Across Regions With Varying Characteristics'). In an embodiment, the agro-ecological zones available for the specific area are generated or identified using a state of the art method (e.g., refer Indian Patent Application No IN 202121018449 titled 'Method And System For Identification Of Agro-Phenological Zones And Updation Of Agro-Phenological Zones'). In an embodiment, the set of dynamically selected pixels is indicative of crop yield values that represent the specific area and covers heterogeneity in terms of yield distribution, soil, weather, and agro-ecology. This further helps in developing highly accurate yield forecasting models. In other words, the set of pixels from the plurality of coarse resolution crop yield maps are selected based on the yield distribution, homogeneity of a crop in the selected pixels, soil variation within the selected geography and agro-ecological zones available for the region. The intent of doing this is to get the crop yield data for further modeling which represents the specific area in terms of yield anomalies, soil, weather, agro-ecology, and/or the like. Technique such as the stratified random sampling is used to select the set of pixels based on the variability in terms of above mentioned parameters so as to represent the specific area well in terms of yield. Moreover, outputs derived from the first crop yield forecasting model is used as a ground truth and input to some other model so that pixels with pure target crop are selected. This helps to avoid the bias occurred due to amount and quality of the ground data.

In an example scenario, it is assumed that the plurality of coarse resolution yield maps coarseYield ($t_3$) obtained from step 208 and the plurality of soil data including soil texture data (SoilTex) obtained using the soilGrids™ are available at 250 m spatial resolution. Further, the plurality of crop maps (e.g., wheat crop map in the present disclosure) are developed using a state in the art propitiatory machine learning algorithm for the specific area. The plurality of crop maps are obtained mainly using Sentinel-1 and Sentinel-2 datasets so the spatial resolution of the plurality of crop maps (e.g., wheat crop map in the present disclosure) is 10 m. Also, the agro-ecological zones (say A-EZ) generated using the state of the art method (e.g., refer Indian Patent Application No IN 202121018449 titled 'Method And System For Identification Of Agro-Phenological Zones And Updation Of Agro-Phenological Zones') is available at 1000 m spatial resolution. The plurality of crop maps and the agro-ecological zones are resampled to 250 m which is same as that of the plurality of coarse resolution crop yield maps. The set of dynamically selected pixels (selPixel) from the plurality of coarse resolution crop yield maps is expressed as provided in equation (5) below:

$$\text{selPixel}=f(\text{coarseYield}(t_3),\text{SoilTex},\text{CropMap},A-EZ) \quad (5)$$

Further, at step 212 of FIG. 2, the one or more hardware processors 104 are configured to generate a plurality of high resolution crop yield forecast maps using a second crop yield forecasting model trained with a third set of data. The third set of data comprises (i) a set of satellite data and (ii) a plurality of crop yield data corresponding to the set of dynamically selected pixels. In an embodiment, the first crop yield forecasting model and the second crop yield forecasting model comprises at least one of (i) a multiple linear regression model and (ii) a non-linear regression model depending upon type of crop, region of crop and amount of data availability. In an embodiment, the non-linear regression model may include but not limited to random forest regression, support vector regression, deep learning regression, and/or the like. In an embodiment, the first crop yield forecasting model and the second crop yield forecasting model could be same or different. In an embodiment, one or more crop yield losses are quantified based on information comprised in a dynamically updated database. The dynamically updated database comprises domain knowledge about crop growth stages, economically important crop growth stages and real time weather based adverse event triggers. The plurality of high resolution crop yield forecast maps are obtained by adjusting the quantified one or more crop yield losses.

In an embodiment, the step 212 is better understood by way of following exemplary explanation.

In an embodiment, the plurality of crop yield data from the set of dynamically selected pixels obtained in step 210, openly available high resolution satellite data from Sentinel-1, Sentinel-2, and/or the like, and an additional high resolution data available for soil and weather is used for training the second crop yield forecasting model. In an example scenario, it assumed that the plurality of crop yield data is obtained for 10000 crop yield pixels across 400 districts in accordance with step 210. Thus, for specific pixels from an ongoing season, 10000 samples are obtained for further modeling, the openly available high resolution satellite data and the additional high resolution data available for soil and weather is extracted for the 10000 pixels of the target crop (i.e., wheat crop). In the present disclosure, focus is on pure target crop pixels. Further, machine learning or deep learning based regression relationship is established between the plurality of crop yield data corresponding to the dynamically selected pixels and associated satellite and weather indicators at high resolution such as 10 m. Further, multiple second crop yield forecasting models are trained during a growing season at multiple time instances to decide on the best model for a crop and region. This varies from crop to crop as each crop has unique phenology. Such approach is useful to decide a time during the growing season when the most accurate yield forecast can be obtained. In addition, data on crop specific resilient and susceptible stages to the certain weather events is used. This data accounts for the crop yield loss which may not be captured by the second crop yield forecasting model. Further, data on specific parameters such as rainfall, heatwave, and/or the like along with crop stage such as flowering, senescence, and/or like can be used to adjust the second crop yield forecasting models. Final adjusted crop yield models are used for generating the plurality of high resolution crop yield forecast maps.

It is assumed when the variables such as NDVI($y_1$), EVI($y_2$), NDRE($y_3$), LAI($y_4$), MinTemp($y_5$), MaxTemp($y_6$), and Rainfall($y_7$) are considered, then the second crop yield forecasting model to provide high resolution crop yield at time instant t as provided in equation (6) below:

$$\text{highResYield}(t)=f(y_1,y_2,y_3,y_4 \ldots y_n)(t) \quad (6)$$

Further, the second crop yield forecasting model at time instance $t_1$ may take the following form as provided in equation (7) below:

$$\text{highResYield}(t_1)=y_0+(8.12*y_1)-(0.12*y_3) \quad (7)$$

The second crop yield forecasting model at time instance $t_2$ may take the following form as provided in equation (8) below:

$$\text{highResYield}(t_2)=y_0+(2.18*y_1)-(5.05*y_2)-(0.88*y_4) \quad (8)$$

However, the target crop (i.e., wheat crop) yield is affected if an unusual event such as rainfall occurs during the crop flowering stage, resulting in the crop yield loss which is quantified and expressed as provided in equation (9) below:

$$\text{yieldLoss}=f(\text{crop,growth stage,intensity/amount of event}) \quad (9)$$

In case of wheat crop, the quantified crop yield loss due to rainfall during flowering stage could be expressed as provided in equation (10) below:

$$\text{yieldLoss}=x_0+(x_1*acc_{rain}) \quad (10)$$

Here, acc_rain refers to accumulated amount of rainfall during the flowering stage of wheat crop.

Further, the high resolution crop yield forecast maps obtained by adjusting the quantified crop yield losses at time instance $t_2$ are expressed as provided in equations (11) and (12) below:

$$\text{highResYield\_adj}(t_2)=f(\text{highResYield}(t_2),\text{yieldLoss}) \quad (11)$$

$$\text{highResYield}_{adj}(t_2)=\text{highResYield}(t_2)-\text{yieldLoss} \quad (12)$$

Here, time instances are decided based on the crop season. Moreover, for each time instance, variables considered by the second crop yield forecasting model is decided by the second crop yield forecasting model dynamically by using the one or more feature selection technique to get the best performance. For example, it is assumed that $R_2$ of the model is 0.81 and 0.89 at time instance $t_1$ and $t_2$. As the second crop yield forecasting model at time instance $t_2$ has the highest $R_2$, the same second crop yield forecasting model is used to generate the plurality of high resolution crop yield forecast maps.

In an embodiment, the plurality of high resolution crop yield forecast maps are scalable. Since, the set of dynamically selected pixels is indicative of crop yield value covers heterogeneity in terms of yield distribution, soil, weather, and agro-ecology. Thus, the plurality of high resolution crop yield forecast maps may be scaled from one geography to another geography resulting into scalability.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method comprising:

receiving, via one or more hardware processors, a first set of input data associated with a target crop in a specific area, the first set of input data comprises a plurality of satellite data, a plurality of weather data, a plurality of soil data, and a plurality of district level crop yield data, wherein the plurality of satellite data comprises a plurality of images, one or more satellite indices, and one or more satellite indicators;

preprocessing, via the one or more hardware processors, the first set of input data based on one or more pre-processing techniques to obtain a plurality of time-series representations of the first set of input data;

training, via the one or more hardware processors, a first crop yield forecasting model using the plurality of time-series representations of the first set of input data at a plurality of time instances of a growing season of the target crop, for determining an optimum time for crop yield forecasting for the target crop in the specific area, and a machine learning or deep learning based regression relationship is established between the specific area yield data and satellite and weather based indices, indicators, and a modeling process is repeated at the plurality of time instances (t1, t2, t3, t4) during the growing season by considering a plurality of variables including normalized difference vegetation index (NDVI), enhanced vegetation index (EVI), leaf area index (LAI), MinTemp, MaxTemp, and rainfall;

generating, via the one or more hardware processors, a plurality of coarse resolution crop yield maps of the target crop in the specific area based on an optimal performance of the first crop yield forecasting model, wherein the optimal performance of the first crop yield forecasting model is achieved by dynamically performing one or more feature selection techniques on the first crop yield forecasting model, wherein each coarse resolution crop yield map from the plurality of coarse resolution crop yield maps comprises a plurality of pixels, and wherein each pixel from amongst the plurality of pixels is associated with a location and a spatial resolution, wherein when applying the first crop yield forecasting model, the plurality of variables are chosen by the first crop yield forecasting model at predefined resolution and generate the plurality of coarse resolution yield maps, the resolution depends on the type of variable chosen by an optimum model;

dynamically selecting, via the one or more hardware processors, a set of pixels from the plurality of pixels of each coarse resolution crop yield map from the plurality of coarse resolution crop yield maps by applying a stratified random sampling based technique on a second set of input data, wherein the second set of input data comprises the plurality of coarse resolution crop yield maps of the target crop in the specific area, a plurality of crop maps, the plurality of soil data, and a plurality of data related to agro-ecological zones available for the specific area, wherein the plurality of crop maps and the agro-ecological zones are resampled to predefined resolution that is same as that of the plurality of coarse resolution crop yield maps; and generating, via the one or more hardware processors, a plurality of high resolution crop yield forecast maps using a second crop yield forecasting model trained with a third set of data, wherein the third set of data comprises (i) a set of satellite data and (ii) a plurality of crop yield data corresponding to the set of dynamically selected pixels.

2. The method of claim 1, wherein the stratified random sampling based technique comprises at least one of (i) a probability sampling or (ii) a non-probability sampling depending upon variability of a region of crop.

3. The method of claim 1, wherein the first crop yield forecasting model and the second crop yield forecasting model comprises at least one of (i) a multiple linear regression model and (ii) a non-liner regression model depending upon type of crop, region of crop and amount of data availability.

4. The method of claim 1 further comprises quantifying one or more crop yield losses based on information comprised in a dynamically updated database, wherein the dynamically updated database comprises domain knowledge about crop growth stages, economically important crop growth stages and real time weather based adverse event triggers.

5. The method of claim 4, wherein the plurality of high resolution crop yield forecast maps are obtained by adjusting the quantified one or more crop yield losses.

6. The method of claim 1, wherein the plurality of high resolution crop yield forecast maps are scalable.

7. A system, comprising:

a memory storing instructions;

one or more communication interfaces; and one or more hardware processors coupled to the memory via the one or more communication interfaces, wherein the one or more hardware processors are configured by the instructions to:

receive, a first set of input data associated with a target crop in a specific area, the first set of input data comprises a plurality of satellite data, a plurality of weather data, a plurality of soil data, and a plurality of district level crop yield data, wherein the plurality of satellite data comprises a plurality of images, one or more satellite indices, and one or more satellite indicators;

preprocess, the first set of input data based on one or more pre-processing techniques to obtain a plurality of time-series representations of the first set of input data;

train, a first crop yield forecasting model using the plurality of time-series representations of the first set of input data at a plurality of time instances of a growing season of the target crop for determining an optimum time for crop yield forecasting for the target crop in the specific area, and a machine learning or deep learning based regression relationship is established between the specific area yield data and satellite and weather based indices, indicators, and a modeling process is repeated at the plurality of time instances (t1, t2, t3, t4) during the growing season by considering a plurality of variables including normalized difference vegetation index (NDVI), enhanced vegetation index (EVI), leaf area index (LAI), MinTemp, MaxTemp, and rainfall;

generate, a plurality of coarse resolution crop yield maps of the target crop in the specific area based on an optimal performance of the first crop yield forecasting model, wherein the optimal performance of the first crop yield forecasting model is achieved by dynamically performing one or more feature selection techniques on the first crop yield forecasting model, wherein each coarse resolution crop yield map from the plurality of coarse resolution crop yield maps comprises a plurality of pixels, and wherein each pixel from amongst the plurality of pixels is associated with a location and a spatial resolution, wherein when applying the first crop yield forecasting model, the plurality of variables are chosen by the first crop yield forecasting model at predefined resolution and generate the plurality of coarse resolution yield maps, the resolution depends on the type of variable chosen by an optimum model;

dynamically select, a set of pixels from the plurality of pixels of each coarse resolution crop yield map from the plurality of coarse resolution crop yield maps by applying a stratified random sampling based technique on a second set of input data, wherein the second set of input data comprises the plurality of coarse resolution crop yield maps of the target crop in the specific area, a plurality of crop maps, the plurality of soil data, and a plurality of data related to agro-ecological zones available for the specific area, wherein the plurality of crop maps and the agro-ecological zones are resampled to predefined resolution that is same as that of the plurality of coarse resolution crop yield maps; and generate, a plurality of high resolution crop yield forecast maps using a second crop yield forecasting model trained with a third set of data, wherein the third set of data comprises (i) a set of satellite data and (ii) a plurality of crop yield data corresponding to the set of dynamically selected pixels.

8. The system of claim 7, wherein the stratified random sampling based technique comprises at least one of (i) a probability sampling or (ii) a non-probability sampling depending upon variability of a region of crop.

9. The system of claim 7, wherein the first crop yield forecasting model and the second crop yield forecasting model comprises at least one of (i) a multiple linear regression model and (ii) a non-liner regression model depending upon type of crop, region of crop and amount of data availability.

10. The system of claim 7, further comprises quantifying one or more crop yield losses based on information comprised in a dynamically updated database, wherein the dynamically updated database comprises domain knowledge about crop growth stages, economically important crop growth stages and real time weather based adverse event triggers.

11. The system of claim 10, wherein the plurality of high resolution crop yield forecast maps are obtained by adjusting the quantified one or more crop yield losses.

12. The system of claim 7, wherein the plurality of high resolution crop yield forecast maps are scalable.

13. One or more non-transitory computer readable mediums comprising one or more instructions which when executed by one or more hardware processors cause:

receiving, a first set of input data associated with a target crop in a specific area, the first set of input data comprises a plurality of satellite data, a plurality of weather data, a plurality of soil data, and a plurality of district level crop yield data, wherein the plurality of satellite data comprises a plurality of images, one or more satellite indices, and one or more satellite indicators;

preprocessing, the first set of input data based on one or more pre-processing techniques to obtain a plurality of time-series representations of the first set of input data;

training, a first crop yield forecasting model using the plurality of time-series representations of the first set of input data at a plurality of time instances of a growing season of the target crop, for determining an optimum time for crop yield forecasting for the target crop in the specific area, and a machine learning or deep learning based regression relationship is established between the specific area yield data and satellite and weather based indices, indicators, and a modeling process is repeated at the plurality of time instances (t1, t2, t3, t4) during the growing season by considering a plurality of variables including normalized difference vegetation index (NDVI), enhanced vegetation index (EVI), leaf area index (LAI), MinTemp, MaxTemp, and rainfall;

generating, a plurality of coarse resolution crop yield maps of the target crop in the specific area based on an optimal performance of the first crop yield forecasting model, wherein the optimal performance of the first crop yield forecasting model is achieved by dynamically performing one or more feature selection techniques on the first crop yield forecasting model, wherein each coarse resolution crop yield map from the plurality of coarse resolution crop yield maps comprises a plurality of pixels, and wherein each pixel from amongst the plurality of pixels is associated with a location and a spatial resolution, wherein when applying the first crop yield forecasting model, the plurality of variables are chosen by the first crop yield forecasting model at predefined resolution and generate the plurality of coarse resolution yield maps, the resolution depends on the type of variable chosen by an optimum model;

dynamically selecting, a set of pixels from the plurality of pixels of each coarse resolution crop yield map from the plurality of coarse resolution crop yield maps by applying a stratified random sampling based technique on a second set of input data, wherein the second set of input data comprises the plurality of coarse resolution crop yield maps of the target crop in the specific area, a plurality of crop maps, the plurality of soil data, and a plurality of data related to agro-ecological zones available for the specific area, wherein the plurality of crop maps and the agro-ecological zones are resampled to predefined resolution that is same as that of the plurality of coarse resolution crop yield maps; and generating, a plurality of high resolution crop yield forecast maps using a second crop yield forecasting model trained with a third set of data, wherein the third set of data comprises (i) a set of satellite data and (ii) a plurality of crop yield data corresponding to the set of dynamically selected pixels.

* * * * *